US009876784B2

(12) United States Patent
Arunkumar et al.

(10) Patent No.: US 9,876,784 B2
(45) Date of Patent: *Jan. 23, 2018

(54) TEMPORAL MODIFICATION OF AUTHENTICATION CHALLENGES

(71) Applicant: International Business Machines Corporation, Armonk, NY (US)

(72) Inventors: Saritha Arunkumar, Basingstoke (GB); Stephen D. Pipes, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/425,083

(22) Filed: Feb. 6, 2017

(65) Prior Publication Data

US 2017/0149763 A1    May 25, 2017

Related U.S. Application Data

(63) Continuation of application No. 14/552,541, filed on Nov. 25, 2014, now Pat. No. 9,699,178.

(51) Int. Cl.
*H04L 29/06* (2006.01)
*H04L 29/08* (2006.01)

(52) U.S. Cl.
CPC .......... *H04L 63/083* (2013.01); *H04L 63/102* (2013.01)

(58) Field of Classification Search
CPC ... H04L 63/08; H04L 63/0846; H04L 63/102; H04L 67/306
See application file for complete search history.

(56) References Cited

U.S. PATENT DOCUMENTS 6,720,860 B1    4/2004   Narayanaswami
7,383,570 B2    6/2008   Pinkas et al.
(Continued)

FOREIGN PATENT DOCUMENTS

| EP | 1422589 A1 | 5/2004 |
| EP | 2466519 A1 | 6/2012 |
| IN | 1767/DEL/2013 A | 8/2013 |

OTHER PUBLICATIONS

Alariki, et al., "Touch Gesture Authentication Framework for Touch Screen Mobile Devices", Journal of Theoretical and Applied Information Technology, Apr. 20, 2014, vol. 62, No. 2, © 2005-2014 JATIT & LLS, pp. 493-498, <http://www.jatit.org/volumes/Vol62No2/22Vol62No2.pdf>.

(Continued)

*Primary Examiner* — Noura Zoubair
(74) *Attorney, Agent, or Firm* — Daniel R. Simek (57) ABSTRACT

A method for authenticating a user of a computing device. The method includes a computer processor receiving an indication that a user of a computing device is accessing an object that utilizes an authentication process. The method further includes a computer processor selecting a first multi-media file that is associated with a user profile of the user and the object of the authentication process, wherein the first multi-media file is associated with a baseline user input authentication sequence. The method further includes creating a first temporal manipulation vector based on the user profile and a security requirement of the object of the authentication process, wherein the temporal manipulation vector modifies a presentation of a multi-media file and a corresponding time sequence of a user input authentication sequence in the multi-media file. The method further includes transmitting the first temporal manipulation vector and the first multi-media file to the computing device.

20 Claims, 5 Drawing Sheets

(56) References Cited

U.S. PATENT DOCUMENTS

| | | | |
|---|---|---|---|
| 8,174,503 B2 | 5/2012 | Chin | |
| 8,347,103 B2 | 1/2013 | Jones et al. | |
| 2008/0028205 A1 | 1/2008 | Yang | |
| 2008/0244700 A1* | 10/2008 | Osborn | G06F 21/36 726/2 |
| 2009/0199272 A1 | 8/2009 | Gopalakrishna | |
| 2009/0313693 A1 | 12/2009 | Rogers | |
| 2010/0225443 A1 | 9/2010 | Bayram et al. | |
| 2013/0036342 A1 | 2/2013 | Deo et al. | |
| 2013/0219490 A1 | 8/2013 | Isbister et al. | |
| 2014/0143859 A1 | 5/2014 | Linge et al. | |
| 2014/0223549 A1 | 8/2014 | Quintanilla | |
| 2014/0359653 A1* | 12/2014 | Thorpe | G06F 21/00 725/30 |

OTHER PUBLICATIONS

Choi, et al., "Cloud-based user authentication with geo-temporal queries on smartphones", ACM Digital Library, SCC 14 Proceedings of the 2nd International Workshop on Security in Cloud Computing, pp. 19-26, ACM New York, NY, © 2014, <http://dl.acm.org/citation.cfm?id=2600077&preflayout=flat>.

Dhamija, et al., "Deja Vu: A User Study Using Images for Authentication", SIMS/CS, University of California Berkeley, <http://hornbeam.cs.ucl.ac.uk/hcs/teaching/GA10/lec2extra/d-ej-a-vu.pdf>.

Marques, et al., "Under the Table: Tap Authentication for Smartphones", © The Authors, Published by BCS L&D Ltd, Proceedings of the 27th International BCS Human Computer Interaction Conference, <http://ewic.bcs.org/upload/pdf/ewic_hci13_short_paper14.pdf>.

Yamamoto, et al., "Advantages of User Authentication Using Unclear Images—Automatic Generation of Decoy Images", AINA '09 Proceedings of the 2009 International Conference on Advanced Information Networking and Applications, pp. 668-674, IEEE Computer Society, Washington, DC, <http://dl.acm.org/citation.cfm?id=1578212&preflayout=flat>.

Zheng, et al., "You are How You Touch: User Verification on Smartphones via Tapping Behaviors", Dec. 6, 2012, WM-CS-2012-06, College of William and Mary, Department of Computer Science, Technical Report, <https://www.wm.edu/as/computerscience/documents/cstechreports/WM-CS-2012-06.pdf>.

"User Authentication with Image Verification", PHP MySQL Tutorial, <http://www.php-mysql-tutorial.com/wikis/php-tutorial/user-authentication-with-image-verification.aspx>.

List of IBM Patents or Patent Applications Treated as Related, Apr. 8, 2015.

Saritha Arunkumar, et al., "Temporal Modification of Authentication Challenges", U.S. Appl. No. 14/552,541, filed Nov. 25, 2014.

Saritha Arunkumar, et al., "Temporal Modification of Authentication Challenges", U.S. Appl. No. 14/687,326, filed Apr. 15, 2015.

* cited by examiner

TEMPORAL MODIFICATION OF AUTHENTICATION CHALLENGES

BACKGROUND OF THE INVENTION

The present invention relates generally to the field of user authentication using images, and more particularly to applying temporal knowledge to files wherein the content varies with time to augment authentication.

Computer security typically relies on passwords and other personal identifiers. Multi-character passwords or personal identification numbers (e.g., PIN codes) are a common user authentication method. Web sites, e-commerce applications, and other secured resources require increasingly complex passwords (e.g., longer minimum password lengths, inclusion of non-alpha numeric symbols, rules governing character combinations, password change frequency, etc.) to improve security and act as countermeasures against fraud and cybercriminals (e.g., hackers). Increasingly longer and more complex passwords may confuse the human user or be forgotten by the user. The use of static visual images as a means for a user to authenticate or to gain access to a secure resource, software application, or function is generally known. Such images provide a user a relatively intuitive method to remember and prove knowledge by interacting with a static image or by selecting one or more images from a predefined set of images. Visual cues that are familiar to a user provide an alternative to passwords as a means of authenticating a user. Providing a user with images that have a temporal component (e.g., change with time), such as a video or animation clip, provides the user a larger selection of events to choose from when creating an authentication scheme.

SUMMARY

According to an aspect of the present invention, there is a method, computer program product, and/or system for authenticating a user of a computing device. The method includes a computer processor receiving an indication that a user of a computing device is accessing an object that utilizes an authentication process. The method further includes a computer processor selecting a first multi-media file that is associated with a user profile of the user and the object of the authentication process, wherein the first multi-media file is associated with a baseline user input authentication sequence. The method further includes creating a first temporal manipulation vector based on the user profile and a security requirement of the object of the authentication process, wherein the temporal manipulation vector modifies a presentation of a multi-media file and a corresponding time sequence of a user input authentication sequence in the multi-media file. The method further includes transmitting the first temporal manipulation vector and the first multi-media file to the computing device.

DETAILED DESCRIPTION

Embodiments of the current invention recognize that cybercriminals are becoming more sophisticated and do not need to use "brute force" attacks to defeat password and authentication schemes. Malware executing on a computing device or embedded (e.g., hacked) within the code of a legitimate website can steal authentication information. Man-in-the-middle (MITM) attacks are a form of eavesdropping where the attacker monitors the interactions between a user (e.g., subject) and a secured resource or secured software application (e.g., object), for example, a banking system or an on-line retail store. MITM attacks are predominantly external to the user's computing device (e.g., tablet pc, laptop, smartphone, etc.). Man-in-the-browser (MITB) is a variation of MITM with the MITB malware executing within the environment of the user's web browser rather than monitoring network traffic. MITB can function at either end of the network connection.

Dynamic, moving images offer the user more possible combinations to create an authentication scheme. Similarly, other components of a multi-media file (e.g., audio) may be used as events for a user to integrate within or use as a base for an authentication scheme. The user can employ temporal knowledge of the events within the set of multi-media files to authenticate with rather than passwords or personal information, which has become increasingly easy to obtain from the Internet. However, successive uses of the same set of multi-media files, with the predefined user selections, are vulnerable to MITM and MITB attacks once the cybercriminal processes sufficient data to detect the pattern (e.g., user interactions, events) and the set of multi-media files associated with the authentication. Embodiments of the current invention improve security and reduce the vulnerability of image-based authentication schemes by converting time from a constant to a variable. The point in time (e.g., temporal reference) at which each event and user interaction occur are identified by a user to create an authentication scheme that can be manipulated. A different manipulation may occur for each authentication attempt whether the authentication attempt is successful or fails. To reduce the chance of malware or other types of attacks manipulating the temporal modifications, the authentication server provides a set of multi-media files (e.g., unmodified, preprocessed), the temporal manipulation vectors, the authentication basis (e.g., absolute time references, differential time references), and subsequently analyzes the results. The types of image files can be highly varied, ranging from a simple animation of different colored balls bouncing around an enclosure to a clip of a movie or of a video game where sight and sound increase the number of variables that are need to be matched against a user's response to determine the authentication scheme.

The purpose of a temporal manipulation vector is to manipulate a set of multi-media files such that the preselected events (e.g., dynamic images) and user interaction within the set of multi-media files occur displaced in time from the base time-line the user initially set-up for an authentication protocol. In an embodiment, the time-line for an authentication scheme can be analyzed in terms of a displaced time sequence. In one instance, a displaced time sequence has absolute temporal references that identify the start of presentation and points in time where preselected events are identified via user interactions. For example, within a set of multi-media files the presentation starts at 0.0 seconds, event #1 occurs at 2.5 seconds, event #2 occurs at 5.0 seconds, event #3 occurs at 7.0 seconds, and event #4 occurs at 10.0 seconds. In absolute terms, the displaced time sequence is: 2.5, 5.0, 7.0, and 10.0 seconds. In another instance, the displaced time sequence is expressed in relative terms, the difference between one temporal reference and another temporal reference. In this instance, the relative displaced time sequence is: 2.5, 2.5, 2.0, and 3.0 seconds. In some embodiments, a temporal manipulation vector can be comprised of numerical values interpreted by the client device to modify the presentation of the set of multi-media files. In other embodiments, the temporal manipulation vector may be comprised of control codes that directly affect the behavior of the presentation program playing the set of multi-media files. In a different embodiment, the authentication server maintains control of the application of the temporal manipulation vector to the set of multi-media files and restricts the control of the multi-media presentation software on the client device.

In an embodiment, the set of multi-media files that contain the preselected events used for authentication are modified based on a temporal manipulation vector that varies the frame-rate (i.e., speed) of the presentation and applies one or more "pauses" to create a simple displaced time sequence for the selected events. In another embodiment, the server provides a plurality of temporal manipulation vectors, each with a unique ID to the client device and only one unique ID, and results of the user's interaction with the dynamic images are returned to the server for authentication analysis. Based on the capabilities of the presentation software more complex interactions and manipulations of the set of multi-media files (e.g., event timings) can occur. For example, the frame-rate can vary as a function of time (e.g., a sine wave), and the time function can vary based on a different mathematical function (e.g., square root of the event number).

Embodiments of the current invention herein described relate to the visual presentation of a set of multi-media files and the physical response to user-defined events within the set of multi-media files for authenticating the user. The descriptions of the various embodiments of the present invention herein presented are for the purpose of illustrations but are not intended to be exhaustive or limited to the embodiments disclosed. Many modifications and variations will be apparent to those of ordinary skill in the art without departing from the scope and spirit of the invention. For example, embodiments of the current invention can be applied to alternate physical implementations of the presentation and interaction methods. In once scenario, visual presentations are be combined with voice recognition or a motion sensing device (e.g., eye mapping) to create a "hands-free" implementation (e.g., smart-glasses). In another scenario, listening through headphones (e.g., audio cues) and tapping on the touchscreen of the smartphone may provide more security in a crowd.

Figure 1:
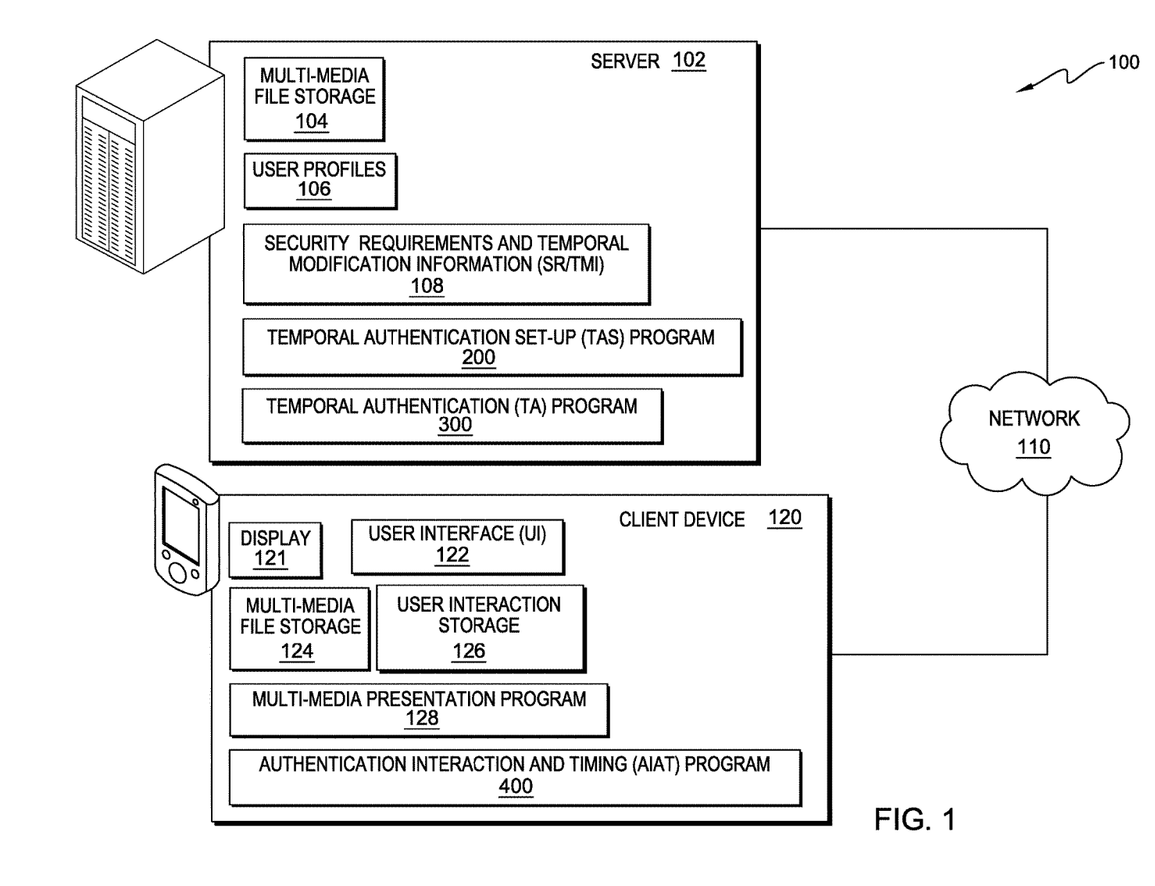
FIG. 1 illustrates a distributed data processing environment, in accordance with an embodiment of the present invention.

The present invention will now be described in detail with reference to the Figures. FIG. 1 is a functional block diagram illustrating distributed data processing environment 100 in an embodiment, in accordance with the present invention. An embodiment of distributed data processing environment 100 includes server 102 and client device 120 interconnected over network 110. Many modifications to the depicted environment may be made by those skilled in the art without departing from the scope of the invention as recited by the claims.

Server 102 may be a laptop computer, a tablet computer, a netbook computer, a personal computer (PC), a desktop computer, a personal digital assistant (PDA), a smart phone, or any programmable computer system known in the art. In certain embodiments, server 102 represents a computer system utilizing clustered computers and components (e.g., database server computers, application server computers, etc.) that act as a single pool of seamless resources when accessed through network 110, as is common in data centers and with cloud-computing applications. In general, server 102 is representative of any programmable electronic device or combination of programmable electronic devices capable of executing machine readable program instructions and communicating with client computers, such as client device 120 via network 110. Server 102 may include components as depicted and described in further detail with respect to FIG. 5, in accordance with embodiments of the present invention.

In one embodiment, client device 120 and server 102 communicate through network 110. Network 110 can be, for example, a local area network (LAN), a telecommunications network, a wide area network (WAN) such as the Internet, or any combination of the previous, and can include wired, wireless, or fiber optic connections. In general, network 110 can be any combination of connections and protocols that will support communications between client device 120 and server 102, in accordance with embodiments of the present invention.

Server 102 includes multi-media file storage 104, user profiles 106, security requirements and temporal modification information (SR/TMI) 108, temporal authentication set-up (TAS) program 200, temporal authentication (TA) program 300, and a media manipulation program (not shown).

In an embodiment, sets of multi-media files are stored in multi-media file storage 104 and are transmitted (e.g., streaming video, downloaded, etc.) to client device 120, via network 110, in response to a request (e.g., activity detection), by a user, for access to a secured object. In another embodiment, the sets of multi-media files remain stored on client device 120, in multi-media file storage 124, after TAS program 200 identifies the user interactions and timing data for the events within the dynamic images within the set of multi-media files.

In one embodiment, user profiles 106 includes, but is not limited to, user identification information, multi-media file preferences, information regarding client device 120, information related to multi-media presentation program 128, user interactions (e.g., time, duration, direction, etc.), references to temporal modification information (e.g., current temporal manipulation vectors, historical data), and references to a set of multi-media files, respectively associated with the events. Server 102 contains multiple user profiles within user profiles 106 and multiple profiles may be associated with a user. For example, each object authenticated is associated with a user profile. The displaced time sequence for a given authentication scheme is associated with a user profile. In one scenario, user profiles 106 contains user preferences related to temporal (e.g., timing) constraints. In one instance, a user defines a preference that the set of multi-media files play for 20 seconds or less. In another instance, the user defines a preference relating to the degree of temporal displacement that is applied to the occurrence of the original event. For example, events occur within +/−3.0 seconds of the event's timing in baseline presentation. These example preferences constrain the amount of temporal manipulation that is subsequently applied by to the set of multi-media files or dynamic images. In another scenario, a multi-media presentation program lacks the capability to vary the frame-rate of the multimedia file. In this scenario, pausing or skipping portions of the dynamic images are the options available to manipulate the timing of the occurrences (e.g., interaction) of events. In another embodiment, user profiles 106 may also include user IDs and passwords. Server 102 acts as a proxy to transmit a user ID and password to a secure software application (not shown) or a secured object (not shown) that does not support direct authentication by temporal authentication (TA) program 300.

Security requirements and temporal modification information (SR/TMI) 108 defines the security requirements associated with a secured object. For example, the security requirements constrain the number of points required to produce authentication, the one or more methods that a user employs to identify interactions with the identified points, and the one or more thresholds (e.g., tolerances) associated with the interactions. In one embodiment, a protocol associated with SR/TMI 108 allows client device 120 direct access to a secured object. In one scenario, a function within client device 120 allows server 102 to transmit a notice of authentication to a secured object. In another scenario, SR/TMI 108 provides the requirements that permit server 102 to act as a gateway from client device 120 to an object via network 110 (e.g., Internet e-commerce payment function). In another embodiment, server 102 acts a password proxy server. For example, user profiles 106 contains a user profile which may contain passwords (e.g., encrypted, non-encrypted) that server 102 transmits at the request of client device 120 to the secured object when the authorization via dynamic images is approved (i.e., passes).

In addition, SR/TMI 108 includes the temporal modification information associated with a set of multi-media files. For example, SR/TMI 108 is comprised of files and algorithms to create temporal manipulation (e.g., displacement times) vectors, an ID assigned to a temporal manipulation vector, and the security requirements associated with a secured object. A temporal manipulation vector, or block of temporal manipulation vectors, can be comprised of a plurality of controls that affect the timing (e.g., when the dynamic image occurs in the multi-media file) of the user selected interaction/identification points. The types of controls that may be employed are dictated by multi-media presentation program 128 and any identified constraints within a user profile. For example, one version of multi-media presentation program 128 is limited to varying the frame-rate (i.e., playback speed), as a preference, prior to the start of the presentation program. This version of multi-media presentation program 128 includes the functionality to pause and skip ahead a fixed time interval. Another version of multi-media presentation program 128 may include repeat (e.g., loop back, restart) and jump back fixed time intervals. Still other versions of multi-media presentation program 128 may permit a higher level of customization. For example, a presentation program capable of animation, accepting meta-data, or musical instrument digital interface (MIDI) information is more customizable.

Figure 2:
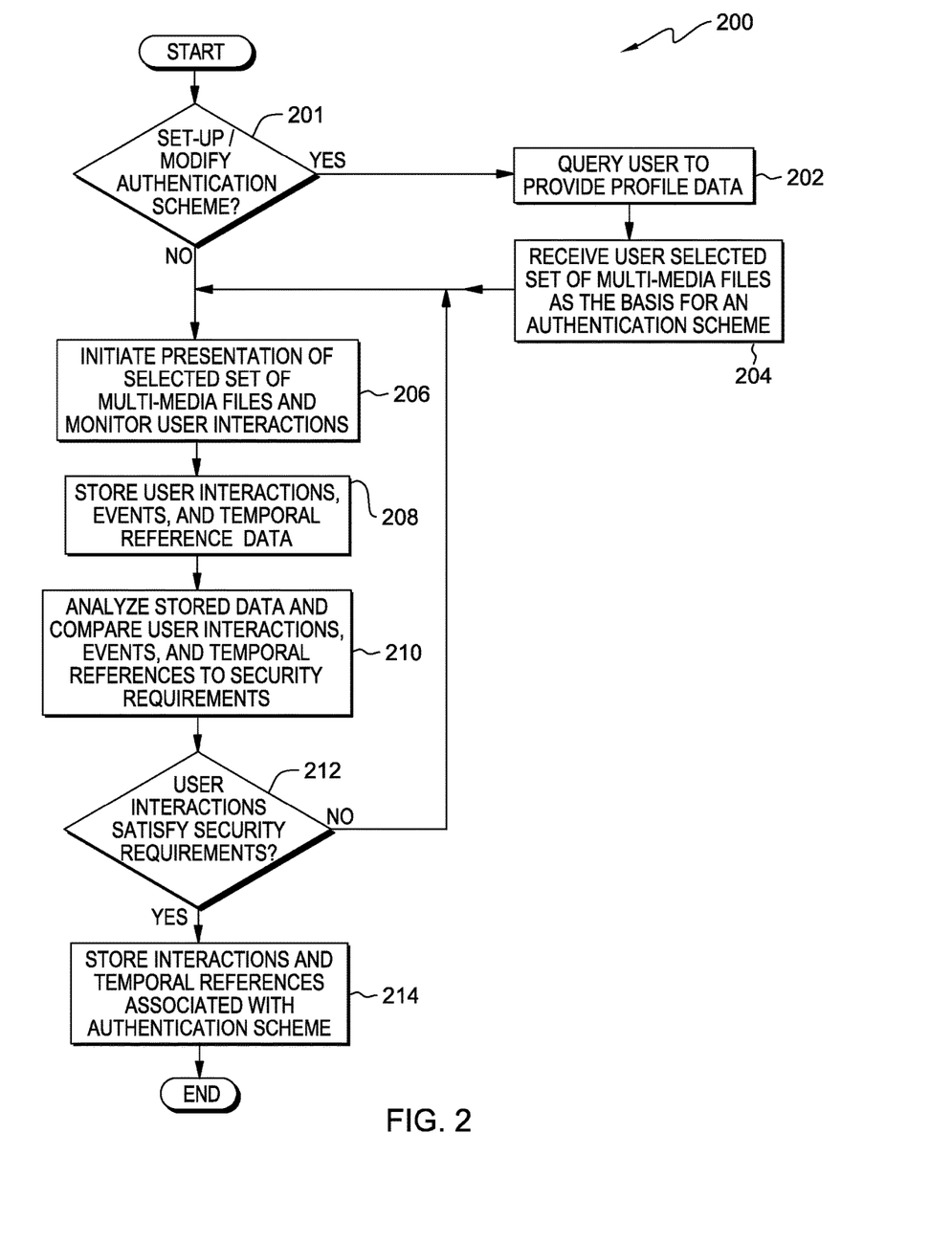
FIG. 2 depicts a flowchart of the steps of a temporal authentication set-up program, in accordance with an embodiment of the present invention.

Temporal authentication set-up (TAS) program 200 creates the initial documentation of the interactions and timings (e.g., temporal references) defined by user actions (e.g., preselections) associated with one or more dynamic images for a given set of multi-media files. TAS program 200 also creates and updates the profile of a user. For example, the user may identify secured objects to access, constraints on the length or degree of modification applied to set of multi-media files, or information related to client device 120 and installed software applications. TAS program 200 applies information and requirements provided by SR/TMI 108 to determine if the interactions of a user with a given set of multi-media files provide sufficient security information to permit authentication for a given secured object. If TAS program 200 determines that the received user interactions, events, and timings are sufficient to produce a secure authentication, then TAS program 200 stores the interactions and temporal references (e.g., baseline information) related to the set of multi-media files and associates the interactions and temporal references with a user profile.

Figure 3:
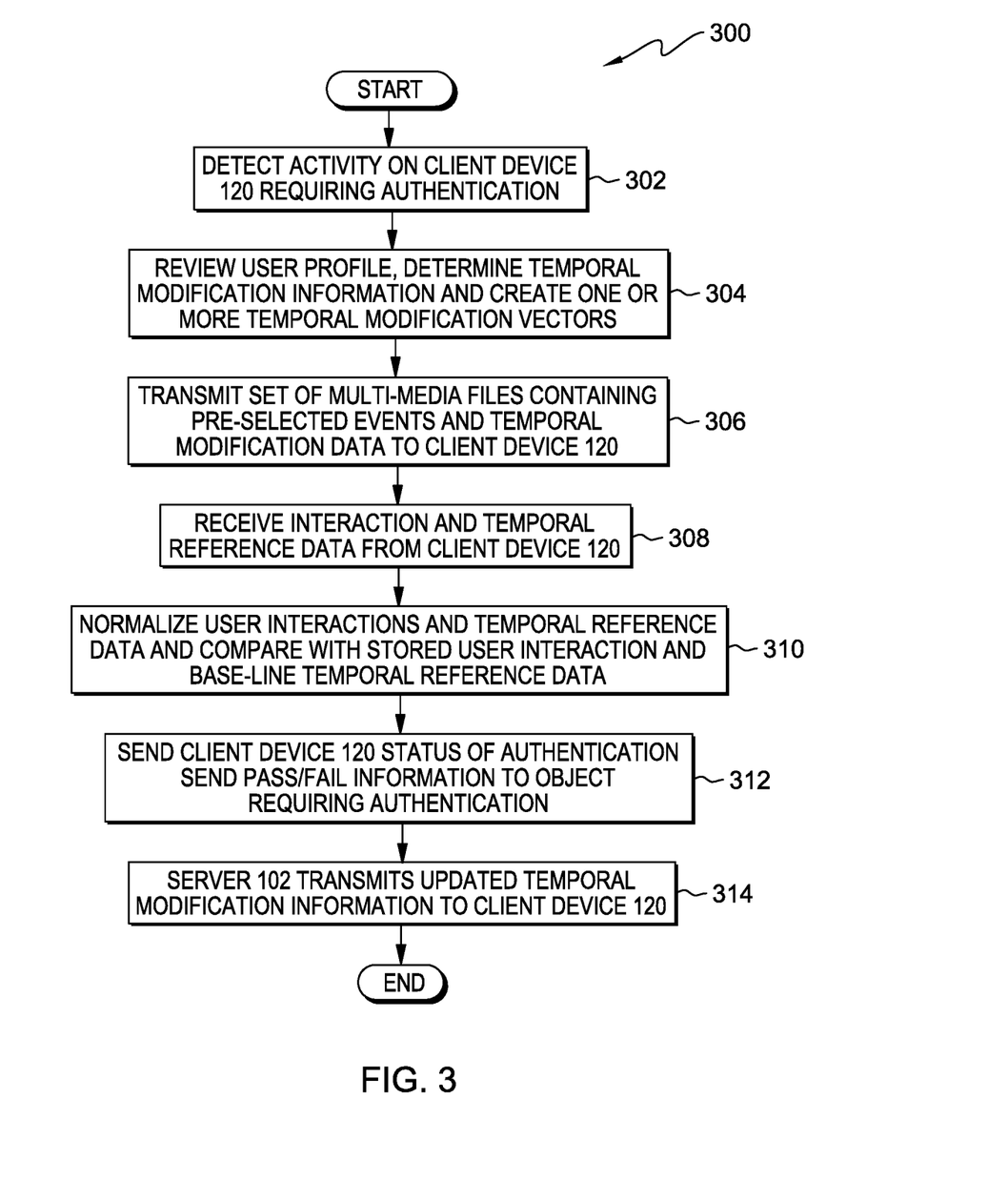
FIG. 3 depicts a flowchart of the steps of a temporal authentication program, in accordance with an embodiment of the present invention.

Temporal authentication (TA) program 300 detects activity from client device 120 that requires authentication, creates one or more temporal manipulation vectors, and associates the one or more temporal manipulation vectors with a user profile and a secured object. TA program 300 transmits a set of multi-media files from multi-media file storage 104 and a temporal manipulation vector to device 120. In one embodiment, TA program 300 supplies a temporal manipulation vector and a set of multi-media files, containing dynamic images, in real-time (e.g., streaming video). In another embodiment, TA program 300 delays the activation of authentication interaction and timing (AIAT) program 400 until client device 120 responds that the required information is present and complete (e.g., the set of multi-media files). This embodiment provides protection from buffering delays, which increase the probability of a failed authentication (e.g., the dynamic images are skewed by the buffering delays). TA program 300 receives the interaction and timing responses to the dynamic images and normalizes the received interaction and timing responses for the current temporal manipulation vector and the current authentication request. TA program 300 compares the normalized user responses to the stored user responses, within the applicable threshold, and determines whether the authentication request passes or fails.

Client device 120 may be a personal computer (PC), a server, a laptop computer, a tablet computer, a netbook computer, a personal digital assistant (PDA), a smart phone, a wearable device (e.g., digital eyeglasses, smart glasses, smart watches), or any programmable computer system operating wired or wirelessly (e.g., WAN, laser, infra-red) known in the art. In general, client device 120 is representative of any programmable electronic device or combination of programmable electronic devices capable of executing machine readable program instructions and communicating with computers, such as server 102 via network 110. Client device 120 may include components as depicted and described in further detail with respect to FIG. 5, in accordance with embodiments of the present invention.

In one embodiment, client device 120 is associated with user profiles 106. Each client device 120 owned by a user may have unique interaction and duration information (e.g., displaced time sequence), stored in user profiles 106, for the same set of multi-media files and preselected events. For example, a smartphone has a smaller area with which to interact than a laptop. The touch-screen on a smartphone is both the output and input device. A laptop has a larger display area, and the input device is a mouse or a keyboard. In one instance, TA program 300 responds to the same dynamic image authentication scheme for either device by determining one or more proportionality factors to compensate for the difference in areas between the smartphone and the laptop. In another instance, a unique timing sequence is stored in user profiles 106 for the smartphone and for the laptop.

Client device 120 includes display 121, user interface (UI) 122, multi-media file storage 124, user interaction storage 126, multi-media presentation program 128, and authentication interaction and timing (AIAT) program 400. Display 121 may be a touch screen, a monitor, a wearable device, or a projector. A user of client device 120 can interact with UI 122 via a singular device, such as touch screen (e.g., display 121) that performs both input to a graphical user interface (GUI) and as an output device (e.g., a display) presenting a plurality of icons associated with software applications or images depicting the executing software application itself. Optionally, a software application can generate UI 122, operating within the GUI of client device 120. UI 122 accepts input from a plurality of input/output (I/O) devices (not shown) including, but not limited to, a keyboard, a mouse, a trackball, a click wheel, a natural user interface (e.g., voice control unit, motion capture device, etc.), and a tactile sensor interface (e.g., a touch screen, a touchpad). The I/O device interfacing with UI 122 may be an integral component of client device 120 or may be connected to client device 120 which may operate wired (e.g., USB port) or wirelessly. The I/O devices provide input from the user in making selections in response to dynamic images presented to the user via display 121.

Multi-media file storage 124 stores the initial set of multi-media files containing dynamic images to produce the baseline interaction and timing (displaced time sequence) data for an authentication scheme. Multi-media file storage 124 also includes individual or clusters (e.g., blocks) of temporal manipulation vectors. In one embodiment, server 102 replaces the temporal manipulation vector between authentications. In one scenario, the temporal manipulation vector is received from server 102 at the beginning of the authentication process. In another scenario, server 102 replaces the temporal manipulation vector at the end of a previous authentication process with a new temporal manipulation vector. In another embodiment, a plurality of temporal manipulation vectors are stored in multi-media file storage 124. In one scenario, the temporal manipulation vectors exist as individual entities. In another scenario, the temporal manipulation vectors exist as members of a group, cluster, list, array, etc. of entities stored in multi-media file storage 124.

In an embodiment, user interaction storage 126 aggregates the user interactions, events, and temporal references in response to the set of multi-media files displayed by multi-media presentation program 128 prior to transmission to server 102. In another embodiment, the user interactions and temporal references for the events that are displayed by multi-media presentation program 128 are transmitted to server 102 as the interactions occur.

Multi-media presentation program 128 presents the user of client device 120, a variety of media stored in a plurality of file formats; for example, photographs (.jpeg), music (.mp3), and video (.avi). Multi-media presentation program 128 includes, but is not limited to, functions that vary the frame rate (e.g., speed-up or slow-down the media presentation), play, pause, skip ahead (e.g., +5 seconds), real-time clock, and completion bar. In an embodiment, multi-media presentation program 128 is a separate software application. For example, multi-media presentation program 128 is associated with the operating system of client device 120. In another example, multi-media presentation program 128 is downloaded and installed by the user of client device 120.

Figure 4:
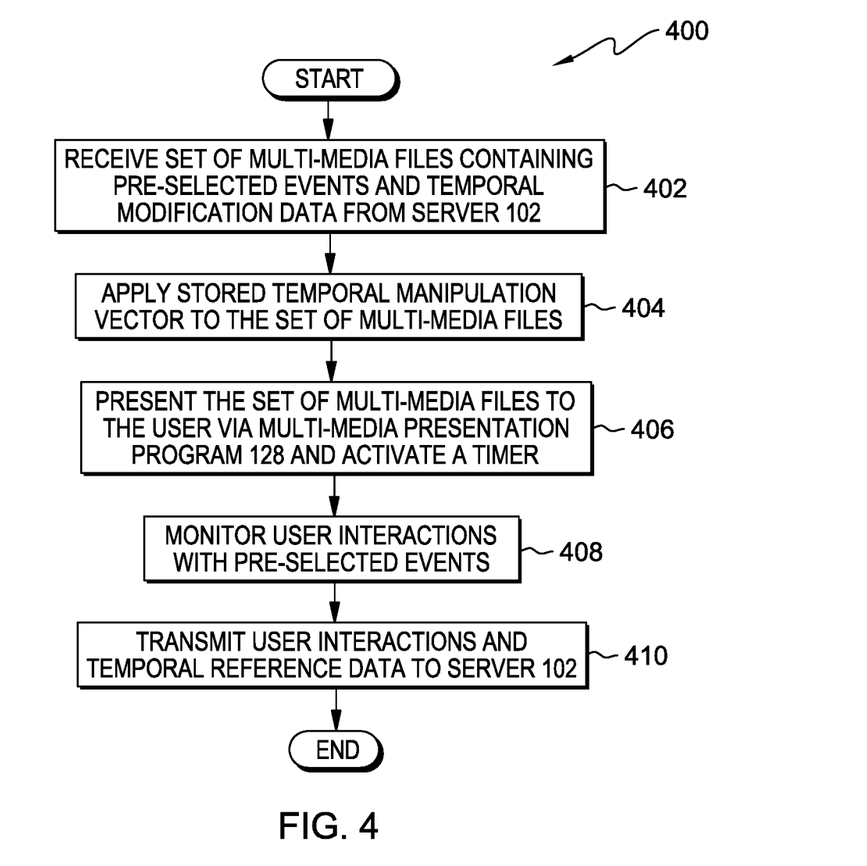
FIG. 4 depicts a flowchart of the steps of an authentication interaction and timing program, in accordance with an embodiment of the present invention.

In another embodiment, multi-media presentation program 128 is associated with another software application (e.g., a plug-in for a web browser). In a different embodiment, multi-media presentation program 128 is integrated with authentication interaction and timing (AIAT) program 400 providing more granular control of the temporal manipulation applied to the dynamic images. An integrated version of multi-media presentation program 128 can be programmed to accept temporal manipulation vectors where the vector value itself changes with time, such as a sine wave or other mathematical equation, which produces an output within the constraints of the user. In this embodiment, the integration of multi-media presentation program 128 and AIAT program 400 provides added security from malware attacks on original equipment manufacturer (OEM) presentation software and multi-media plug-ins (e.g., web browser extension).

Authentication interaction and timing (AIAT) program 400 applies a temporal manipulation vector, received from server 102, to manipulate the timing of events previously identified by the user, within the dynamic images, for the purpose of authentication. AIAT program 400 receives a set of multi-media files from server 102. During the temporally manipulated presentation of the set of multi-media files, AIAT program 400 monitors an attempt by a user to reproduce the interactions with the dynamic images that define the authentication sequence. In one embodiment, AIAT program 400 receives a set of multi-media files on-demand (e.g., triggered by the authentication request). In another embodiment, AIAT program 400 stores the set of multi-media files in multi-media file storage 124 on client device 120 for subsequent use.

FIG. 2 is a flowchart depicting operational steps for temporal authentication set-up (TAS) program 200 executing on server 102 within distributed data processing environment 100 of FIG. 1. A user requests to utilize a multi-media based authentication service provided by server 102. TAS program 200 allows the user of client device 120 to interact with a set of multi-media files to create an authentication scheme based on interacting with dynamic images. The user of client device 120 creates one or more user profiles to associate with a secured object, user preferences and data, and authentication schemes. The security requirements associated with creating the authentication scheme are based, at least in part, on information stored in SR/TMI 108. The authentication scheme created by TAS program 200 is subsequently modified by AIAT program 400 to improve authentication security (e.g., reduce likelihood of man-in-the-middle (MITM) attacks).

In one embodiment, if TAS program 200 determines that the user of client device 120 decides to employ the dynamic image based authentication provided by server 102 (yes branch, decision step 201), then TAS program 200 queries the user to provide profile data (in process step 202) as the initial step to create an authentication scheme. In another embodiment, if the user of client device 120 contacts server 102 to modify some or all aspects of a user profile, including the set of multi-media files used for authentication (yes branch, decision step 201), then TAS program 200 provides the interface, via UI 122, to enact the modifications to a user profile or an authentication scheme.

In step 202, TAS program 200 queries the user of client device 120 to create one or more user profiles. For example, the user decides to have a different profile for each secure resource or secure software application that requires authentication. Each potential device type of client device 120 may require unique training and set-up based on differences in display area and differences in interaction timings caused by different I/O devices. The user profiles can include information associated with a secured object, one or more selected sets of multi-media files used for authentication, personal information (e.g., e-mail address), and temporal constraints.

In step 204, TAS program 200 receives, via UI 122, a user selected set of multi-media files to define one or more authentication schemes based on dynamic images or other components that the user subsequently selects (e.g., events) and with which the user interacts. In one embodiment, TAS program 200 provides the user, via UI 122, a list of themes, stored in multi-media file storage 104, on server 102, from which to select a set of multi-media files to be the basis of an authentication scheme. The user selects a theme or subject matter that the user determines is helpful to remember the interactions upon which the authentication scheme is based. TAS program 200 transmits the selected set of multi-media files to client device 120 and stores the set of multi-media files in multi-media file storage 124. In one scenario, TAS program 200 determines that the user selected a "wilderness" theme. For example, the user may select a real-world video or an excerpt from a video game that contains various animals entering and leaving the field of view. In another scenario, TAS program 200 determines that the user selected a musical theme. In one instance, TAS program 200 determines that the user interacts with the musical theme based on visual cues. In another instance, TAS program 200 determines that the user subsequently interacts with the musical theme based on audio as well as visual cues. In another embodiment, TAS program 200 receives a set of multi-media files that the user uploaded via client device 120. TAS program 200 analyzes the one or more user-uploaded set of multi-media files and determines whether the set of multi-media files is acceptable to use as the basis for an authentication scheme. TAS program 200 bases the analysis, at least in part, by requirements or protocols within SR/TMI 108. For example, the user supplied set of multi-media files may contain unacceptable meta-data, suspect codecs, malware links, copyright concerns, etc.

Referring to decision step 201, if TAS program 200 determines that the user of client device 120 wants to modify the stored interactions and temporal reference data (e.g., timing data) without changing information associated with the user profile (no branch, decision step 201), then TAS program 200 presents the set of multi-media files to the user of client device 120 (in process step 206).

In step 206, TAS program 200 initiates multi-media presentation program 128 and monitors the interaction between the user and components (e.g., dynamic images, sounds, etc.) within the multi-media file. In addition, TAS program 200 starts a timer at the start of the presentation to identify the time-based values for the temporal references associated with events. Alternatively, TAS program 200 may use the system time of client device 120 to identify when events occur and subsequently calculate displaced time values by subtracting the starting time of the presentation from the temporal reference of each event and setting the starting time to be zero. Server 102 monitors the behavior of multi-media presentation program 128 to detect any "buffering" conditions that may affect the accuracy of the timing of user interactions. Subsequently in process step 210, TAS program 200 verifies that the duration of the original set of multi-media files matches the duration set of multi-media files after the user interactions. In one embodiment, the user selects a component, within the presentation of the set of multi-media files, defining an interaction, an event, and a temporal reference for the event. For example, tap the touch-screen of client device 120 once whenever two red balls collide. In another embodiment, two or more interactions define a point to use in subsequent authentication attempts. In one scenario (e.g., the wilderness theme), the user provides input in response to mammals as the basis for events and temporal references (e.g., timings). In one instance, client device 120 is a PC with a mouse and a keyboard. For example, the user utilizes the mouse to "point" and select by left clicking and holding the mouse button, supplying a first interaction. Subsequently, the user tracks (e.g., dragging the mouse pointer) the chosen object and depresses the "space" bar on the keyboard to take a picture of the selected mammal at a point in time selected by the user thereby creating a second interaction. In another instance, client device 120 is a smartphone with a touch screen and multi-media presentation program 128 displays a music score. The musical notes light up as the musical notes play (e.g., electronic sheet music). A tap on the touch-screen of the smartphone identifies a lighted note (e.g., A-flat) as the object to be an event and a temporal reference. In a hybrid implementation, visual and audio cues are used. A "held" tap produces duration information associated with the temporal reference. For example, the user "holds" the tap longer for a whole note than for a quarter note. In another embodiment, client device 120 sends each interaction, event, and temporal reference to server 102 as the event interactions complete.

In step 208, TAS program 200 stores the user interactions, events, and temporal reference data. In one embodiment, the user interactions, events, and temporal reference data are stored on client device 120, in user interaction storage 126, until a set of interaction and timing data is aggregated. The interaction and timing data is stored on client device 120 until TAS program 200 determines that the authentication scheme satisfies the security requirements. In one scenario, TAS program 200 determines that the authentication scheme does not satisfy the security requirements (e.g., too few interactions points), and TAS program 200 allows the user to rerun the selected set of multi-media files and add sufficient points to meet the requirements of SR/TMI 108. In another scenario, TAS program 200 deletes the interactions, events, and temporal reference data in user interaction storage 126 and requires the user to recreate the authentication scheme.

In step 210, TAS program 200 analyzes the interactions that the user employed and the timing of the interactions while identifying points within the set of multi-media files that change as a function of time. TAS program 200 determines whether the user interactions, number of events, temporal reference data, and displaced time sequence satisfies the security requirements of at least server 102 and any additional security requirements supplied by the secured object. In one embodiment, TAS program 200 obtains the required security requirements from SR/TMI 108. In another embodiment, the security requirements are based, at least in part, on information received by server 102 from a computing system (not shown) hosting the secured object or the object application itself. For example, the predetermined threshold (e.g., tolerance) of each user interaction is dictated to be within +/−300 milliseconds of the preselected event. Additionally, TAS program 200 verifies that the duration of the original set of multi-media files matches the duration set of multi-media files after the user interactions. If the durations do not match, then TAS program 200 flags the analysis as a security requirement failure. In a further embodiment, SR/TMI 108 does not immediately assign a tolerance to a user profile associated with the set of multi-media files.

SR/TMI 108 requires TAS program 200 to loop through decision step 212 a fixed number of executions storing the user interactions, events, and temporal referenced for each attempt. Server 102 calculates a tolerance for a user profile based, at least in part, on information within SR/TMI 108 and statistics calculated based on the user interactions and temporal references for the fixed number of executions.

If TAS program 200 determines that the user interactions, number of events, and temporal reference data do not satisfy one or more security requirements (no branch, decision step 212), then TAS program 200 sends the user an indication documenting the security failure and which one or more requirements to address to satisfy the one or more security requirements. In one embodiment, TAS program 200 resets the authentication set-up process. In one scenario, the set of multi-media files fails to meet one or more security requirements. In another scenario, the number or duration of user interactions and temporal reference data (e.g., displaced time sequence) fails to meet one or more security requirements. In another embodiment, TAS program 200 permits the user to edit or add interactions or temporal reference points to the initial set-up data that is stored. TAS program 200 re-analyzes the user interactions, events, and temporal reference data to apply the changes to the displaced time sequence.

If TAS program 200 determines from the analysis of user interactions, number of events, and temporal references (e.g., reference points) satisfies one or more security requirements identified within SR/TMI 108 (yes branch, decision step 212), then TAS program 200 subsequently stores the user interactions, events, and temporal references (e.g., displaced time sequence) in step 214.

In step 214, TAS program 200 stores interactions and temporal references associates with the authentication scheme. The user interactions, events, and temporal references are associated with a user profile for the set of multi-media files. In one embodiment, TAS program 200 stores the user interactions and temporal references in user profiles 106. In another embodiment, TAS program 200 securely stores the user interactions, events, and temporal references in another location on server 102. In an alternate embodiment, TAS program 200 stores the user interactions, events, and temporal references on client device 120 in user interaction storage 126.

In addition, TAS program 200 further analyzes the user interactions, the number of events, and the temporal references to create a baseline (i.e., first) displaced time sequence for the initial presentation of the set of multi-media files without the application of temporal modifications.

FIG. 3 is a flowchart depicting operational steps for temporal authentication (TA) program 300, executing on server 102 within distributed data processing environment 100 of FIG. 1. TA program 300 responds to user activity on client device 120 that requires authentication to access a secured object. In one embodiment, TA program 300 transmits the set of multi-media files and a temporal manipulation vector to client device 120 for each authentication request. In another embodiment, one or more files required for enabling authentication remain on client device 120. In one scenario, the temporal manipulation vector remains on client device 120 until authentication succeeds or until an authentication failure driven event occurs (e.g., lock-out). At the end of the execution, TA program 300 transmits a replacement temporal manipulation vector to client device 120. In another scenario, TA program 300 transmits a block of temporal manipulation vectors to client device 120. TA program 300 may replace the block of temporal manipulation vectors based on a variety of conditions that are defined by server 102 or within user profiles 106. For example, the block of temporal manipulation vectors is replaced at random, based on time, based on the percentage of unused vectors, based on authentication failures, or based on a user profile change (e.g., duration constraint). In some embodiments, TA program 300 ensures that the replacement of temporal manipulation vectors does not coincide with an authentication attempt.

In step 302, TA program 300 detects activity that requires authentication via server 102. For example, the user of client device 120 attempts to access a secured object. In one embodiment, server 102 controls the access to the secured object. In another embodiment, server 102 acts as a proxy between client device 120 and a computing system (not shown) hosting the secured object that requires authentication.

In step 304, TA program 300 reviews user profiles 106 and SR/TMI 108 to determine one or more requirements that affect the creation of one or more temporal manipulation vectors. In one embodiment, the creation of temporal manipulation vector is based, at least in part, on a profile within user profiles 106 on server 102. In one scenario, a temporal manipulation vector is based on the security requirements of the computing system (not shown) hosting the secured object. In another scenario, the temporal manipulation vector is based, at least in part, on the user profile and security requirements within SR/TMI 108 for server 102. In a different scenario, the temporal manipulation vector is constrained based on the number of events associated with the set of multi-media files used for authentication as described in FIG. 2. For example, the "skip ahead" feature for multi-media presentation program 128, on client device 120, is fixed at 15 seconds. In this example, TA program 300 cannot create a temporal manipulation vector using the "skip ahead" feature for some or all events if the user preselected events occur less than 15 seconds apart or if introducing the "skip ahead" increase the total presentation length beyond a user constraint. TA program 300 identifies the number of events, user constraints, capabilities of multi-media presentation program 128, duration of the set of multi-media files, and security requirements; and inputs these values into an algorithm within SR/TMI 108 to create one or more temporal manipulation vectors. In some embodiments, the resultant temporal manipulation vector has a value or presentation control for each event. In other embodiments, the resultant temporal manipulation vector may not have a value or presentation control for each event.

In a different embodiment, TA program 300 determines that server 102 preprocesses the set of multi-media files (e.g., dynamic images), via a media manipulation program (e.g., an animation program), applying the temporal manipulation vector at server 102 rather than on client device 120. In one scenario, TA program 300 determines, from user profiles 106, that client device 120 does not possess a multi-media presentation program 128 sufficiently capable of rendering the presentation of the set of multi-media files incorporating a temporal manipulation vector that meets SR/TMI 108 requirements for a secured object subject to authentication. In another scenario, TA program 300 determines that client device 120 is resource constrained. For example, authentication attempts consistently fail; however, each attempt demonstrates a different normalized multi-media file presentation length subsequently determined in process step 310. In this scenario, a SR/TMI 108 protocol allows TA program 300 to transmit over-ride commands to AIAT program 400 to bypass the process steps associated with applying of the temporal modification information to the set of multi-media files or to the control of multi-media presentation program 128. TA program 300 instructs server 102 to preprocess the set of multi-media files via a media manipulation program. In addition, TA program 300 designates, to server 102, which multi-media file type is to be output by the media manipulation program, or server 102 reformats the output of the media manipulation program to be compatible with multi-media presentation program 128.

In step 306, TA program 300 transmits the set of multi-media files that contain the dynamic images with which the user interacts to facilitate authentication. In one embodiment, the temporal modification data (e.g., temporal manipulation vector) is transmitted at the same time as the set of multi-media files from server 102 to client device 120 via network 110. In one scenario, the authentication process does not begin until server 102 obtains an indication from client device 120 that the set of multi-media files required for authentication are successfully received. In another scenario, the set of multi-media files are streamed from server 102 to client device 120 via network 110, and the authentication process occurs in real-time. In another embodiment, the temporal manipulation vector was stored in multi-media file storage 124 on client device 120 at the end of a prior authentication request (in process step 314). The temporal manipulation vector associated with a set of multi-media files can be a singular file, multiple individual files, or a member of a block (e.g., cluster, list, etc.) of information within a file. In a different embodiment, TA program 300 transmits a reformatted, preprocessed set of multi-media files to client device 120. Additionally, TA program 300 transmits a null temporal manipulation vector, a null vector ID, or no temporal manipulation vector to client device 120 when a preprocessed set of multi-media files are transmitted.

In a further embodiment, each temporal manipulation vector is assigned a unique ID for subsequent tracking, verification, and use restrictions. In one scenario, to improve the security associated with the one or more temporal manipulation vectors, the files are encrypted when transmitted from server 102 to client device 120. The temporal manipulation vectors can remain encrypted while in persistent storage in multi-media file storage 124 until utilized by AIAT program 400. In another scenario, TA program 300 does not reuse (e.g., apply to a set of multi-media files, control multi-media presentation program 128 dynamic images in process step 404) temporal manipulation vectors or only reuses a temporal manipulation vector after a security rule is satisfied (e.g., every 180 days). For example, a "fresh" temporal manipulation vector is available for each authentication. The "fresh" temporal manipulation vector is received at either process step 306 or process step 314, in accordance with an embodiment of the current invention. In a different scenario, TA program 300 produces a block of temporal manipulation vectors and assigns each temporal manipulation vector a unique ID. Server 102 transmits the encrypted block of temporal manipulation vector to client device 120. To discourage MITM attacks, which may be able to identify information within a single temporal manipulation vector during transmission in process step 306, TA program 300 selects a random ID from the block of temporal manipulation vectors assigned to a given user profile. TA program 300 transmits the random temporal manipulation ID to client device 120. Subsequently, AIAT program 400 references the transmitted, random ID to select a temporal manipulation vector from the block of temporal manipulation vectors stored in multi-media file storage 124.

Further security measures may employ unique file names as well as IDs for synchronizing, verifying information, and detecting security breaches between server 102 and client device 120. Another security measure that may be employed is that an individual temporal manipulation vector or blocks of temporal manipulation vectors "expire" and are replaced. The replacement of "expired" temporal manipulation vectors can occur before an authentication attempt, post authentication, or at any time other than during an authentication that server 102 is in contact with client device 120.

Referring to FIG. 3 in step 308, TA program 300 receives the interaction and temporal reference data from AIAT program 400, executing on client device 120. In one embodiment, TA program 300 receives a complete set of user interactions, events, and temporal reference data for the current authentication request. In another embodiment, TA program 300 receives the user interactions, events, and temporal reference data as the interactions occur (e.g., real-time) for the current authentication request.

In step 310, in response to receiving the interaction and temporal data reference data from client device 120, TA program 300 normalizes (e.g., recalculates displaced time sequence by removing the effects of the temporal manipulation vector) the received interaction and temporal reference data for preselected events associated with the set of multi-media files to create another (i.e., second) displaced time sequence. Additionally, TA program 300 compares the normalized displaced time sequence to the baseline displaced time sequence for the presented set of multi-media files. TA program 300 compares the normalized user interactions and temporal reference data for events to the baseline user interactions and temporal reference data for events stored in user profiles 106. Alternatively, TA program 300 determines deviations between the normalized user interactions and temporal reference data for events to the baseline user interactions and temporal reference data for events stored in user profiles 106. TA program 300 applies thresholds or tolerances associated with a set of multi-media files based, at least in part, on SR/TMI 108.

In step 312, TAS program 300 sends client device 120 an indication as the status of the authentication and sends (i.e., transmits) pass or fail information to the object requiring authentication. In one embodiment, the comparison of the user interaction and temporal reference data for the events is within the predetermined thresholds or tolerances identified within on SR/TMI 108 and the authentication is successful (i.e., pass), and TA program 300 advises the user of the successful authentication. In one scenario, server 102 grants client device 120 access to the secured object. In another scenario, server 102 acts as a proxy to allow client device 120 access to the secured object. In another embodiment, the authentications fails. In one scenario, TA program 300 provides the user with another chance to authenticate. In one instance, TA program 300 permits client device 120 to retry the authentication process with the current temporal manipulation vector. In another instance, TA program 300 instructs server 102 to transmit an updated (e.g., new file, different ID) temporal modification information to client device 120. TA program 300 permits client device to retry the authentication process with the updated temporal modification information. In another scenario, TA program 300 transmits information to the secured object identifying that the user failed the authentication. TA program 300 receives an indication from the secured object whether the user of client device 120 may initiate another authentication attempt, the user is locked out, or if the secured object dictates a delay before the user initiates a subsequent authentication attempt.

In an embodiment, in step 314, TA program 300 instructs server 102 to provide client device 120 with "fresh" temporal modification information to be stored in multi-media file storage 124. The "fresh" temporal modification information can include individual or clusters (e.g., blocks) of temporal manipulation vectors, in accordance with an embodiment of the current invention. The fresh temporal modification data replaces the respective temporal modification data stored in multi-media file storage 124.

In a different embodiment, in step 314, if TA program 300 instructs server 102 to transmit a set of preprocessed multi-media files, then updated temporal modification information is not subsequently transmitted to client device 120. In one scenario, TA program 300 instructs server 102 to delete the respective temporal modification information from multi-media file storage 124. In another scenario, TA program 300 instructs server 102 to replace the respective temporal modification information on multi-media file storage 124 with a null temporal manipulation vector or a null ID.

FIG. 4 is a flowchart depicting operational steps for authentication interaction and timing (AIAT) program 400 executing on client device 120 within distributed data processing environment 100 of FIG. 1. Authentication interaction and timing (AIAT) program 400 applies temporal manipulation vectors to the set of multi-media files that contain the dynamic images that the user selects and presents the manipulated dynamic images to the user of client device 120. AIAT program 400 monitors the interactions of a user with the dynamic images, which the user previously selected or identified, that are displaced in time from the initial presentation of the set of multi-media files during TAS program 200. AIAT program 400 transmits the user interactions, events, and temporal reference data to server 102 for analysis.

In step 402, AIAT program 400 receives the set of multi-media files containing the dynamic images and the temporal modification data (e.g., a temporal manipulation vector) from server 102. In one scenario, the set of multi-media files are stored on client device 120 in multi-media file storage 124. The complete set of multi-media files required for authentication are present in multi-media file storage 124 before the presentation begins. In another scenario, the set of multi-media files are transmitted in real-time (e.g., a streaming video). In one embodiment, AIAT program 400 receives the temporal modification data from server 102 associated with the current authentication request. In another embodiment, AIAT program 400 uses a temporal manipulation vector that is present in persistent storage on client device 120 (e.g., in multi-media file storage 124). In one scenario, server 102 identifies which temporal manipulation vector is used to modify the dynamic images associated with the current authentication. In one instance, server 102 identifies a file name associated with a temporal manipulation vector. In another instance, server 102 identifies a unique ID assigned to a temporal manipulation vector. In yet another instance, server 102 permits client device 120 to select a temporal manipulation vector. Subsequently, client device 120 transmits the unique ID or the file name associated with the temporal manipulation vector used, or the temporal manipulation vector itself, to server 102 to provide the basis for normalizing the interaction and temporal reference data for the current authentication.

In a different embodiment, AIAT program 400 receives an indication from server 102 that the set of multi-media files were preprocessed by server 102. For example, the indication may include receiving a null temporal manipulation vector, receiving a null ID, or an indication within the set of multi-media files. In this different embodiment, AIAT program 400 does not manipulate the set of multi-media files in process step 404.

In step 404, AIAT program 400 applies the temporal manipulation vectors to the set of multi-media files. In one embodiment, AIAT program 400 applies the temporal manipulation vector by controlling the execution of multi-media presentation program 128. In another embodiment, AIAT program 400 preprocesses the one or more multi-media files containing the components comprising the preselected events via multi-media presentation program 128. In a different embodiment, client device 120 receives a set of preprocessed multimedia file. AIAT program 400 also receives an indication that a temporal manipulation vector is not applied in step 404. For example, server 102 transmits a null temporal manipulation vector. In another example, the name or file extension of the set of multi-media files provides the indication.

In step 406, AIAT program 400 presents the set of multimedia files to the user via multi-media presentation program 128. In addition, AIAT program 400 activates a timer that is used in step 408 to produce the temporal references for the user interactions and events. In an embodiment, multi-media presentation program 128 is a software program on client device 120. For example, multi-media presentation program 128 can be a software application provided by a vendor that supplied the operating system for client device 120, a web browser plug-in, or a downloaded software application (app). In a different embodiment, multi-media presentation program 128 is integrated with AIAT program 400 providing more granular control of the temporal manipulation applied to the dynamic images. In addition, a version of multi-media presentation program 128, integrated with AIAT program 400, may provide increased security in relation to OEM or open-source multi-media presentation programs that may have known vulnerabilities and be subject to attack by hackers or malware.

In step 408, AIAT program 400 monitors the user interactions associated with preselected events within the modified set of multi-media files depicted by the execution of multi-media presentation program 128. For example, the user may use mouse clicks, keyboard key combinations, touch screen taps, touch screen trace, etc. reproducing the interaction methods and mark (e.g., timer data) the temporal references (e.g., images, events, etc.) that were preselected by the user during the baseline set-up (i.e., TAS program 200) for the set of multi-media files to be used for authentication. In one embodiment, the user interactions, events, and temporal references are stored in user interaction storage 126 while the multi-media files are presented. In another embodiment, the user interactions and temporal reference data for events are transmitted to server 102 as they occur (e.g., real-time).

In step 410, AIAT program 400 transmits the user interaction and temporal reference data for events to server 102. In one embodiment, AIAT program 400 deletes the user interaction and temporal reference data from user interaction storage 126 after server 102 returns an indication. Indications may include an acknowledgement from server 102, an authentication pass/fail designation sent to the user of client device 120, or a deletion of the information by server 102 from client device 120. In another embodiment, user interaction and temporal reference data remain stored in user interaction storage 126 for a period of time.

Figure 5:
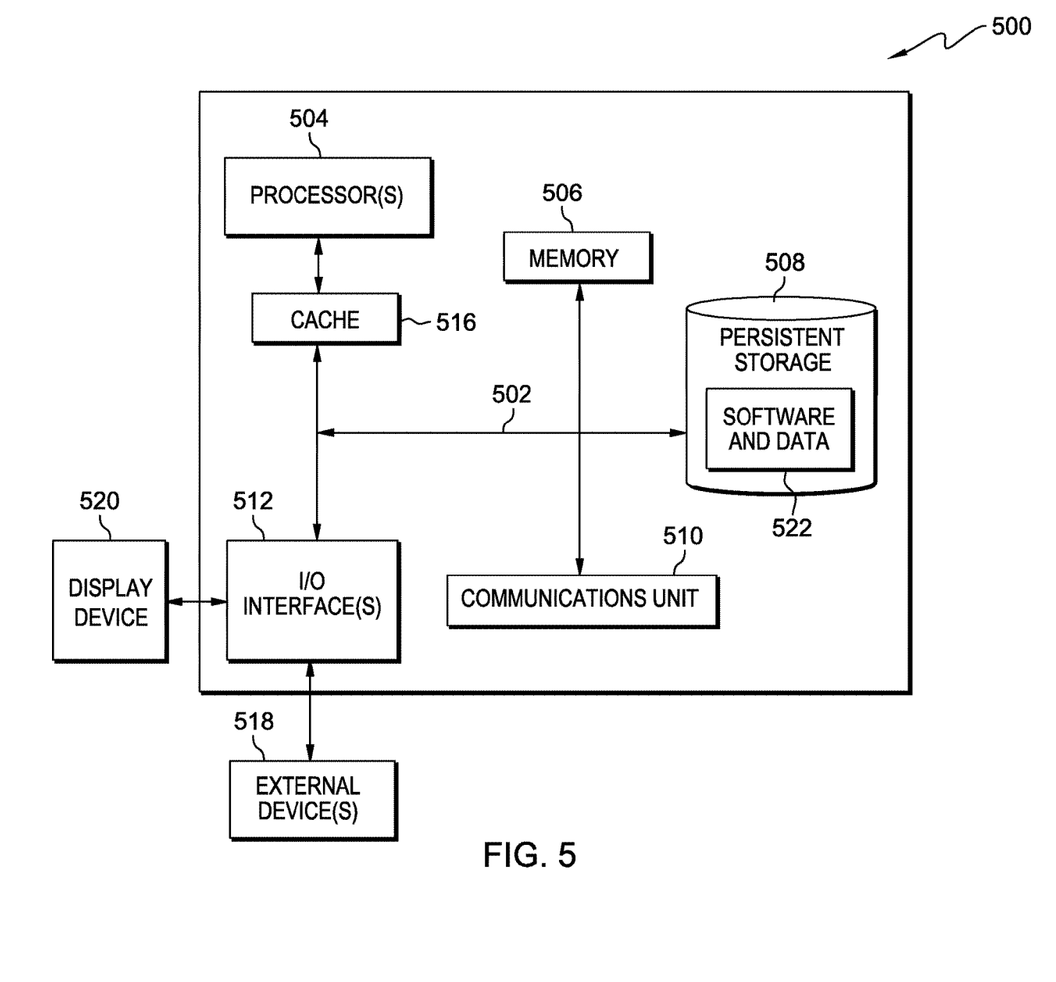
FIG. 5 is a block diagram of components of a computer, in accordance with an embodiment of the present invention.

FIG. 5 depicts computer system 500, which is representative of server 102 and client device 120, in accordance with an illustrative embodiment of the present invention.

Computer system 500 is an example of a system that includes software and data 522. Processors 504 and cache 516 are substantially equivalent to a multi-core processor. Computer system 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data and data near accessed data from memory 506.

Program instructions and data used to practice embodiments of the present invention may be stored in persistent storage 508 for execution by one or more of the respective processors 504 via cache 516 and one or more memories of memory 506. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508. Software and data 522 are stored in persistent storage 508 for access and/or execution by one or more of the respective processors 504 via cache 516 and one or more memories of memory 506. With respect to server 102, software and data 522 includes multi-media file storage 104, user profiles 106, security requirements and temporal modification information (SR/TMI) 108, temporal authentication set-up (TAS) program 200, temporal authentication (TA) program 300, and media manipulation program. With respect to client device 120, software and data 522 includes user interface (UI) 122, graphical user interface (GUI) not shown, multi-media file storage 124, user interaction storage 126, multi-media presentation program 128, and authentication interaction and timing (AIAT) program 400.

Communications unit 510, in these examples, provides for communications with other data processing systems or devices, including resources of server 102 and client device 120. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data, and software and data 522 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor. Display 520 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for authenticating a user of a computing device, the method comprising: selecting, by one or more computer processors, a first multi-media file based on a user profile of the user and an object of an authentication process, wherein the first multi-media file is associated with a baseline time sequence of interactions of the user corresponding to an authentication sequence of one or more preselected events of the first multi-media file, and wherein the first multi-media file is supplied by the user;

creating, by one or more computer processors, a block of temporal manipulation vectors based, at least in part, on the user profile and a security requirement of the object of the authentication process, wherein a temporal manipulation vector, of the block of temporal manipulation vectors modifies a presentation of a multi-media file by displacing one or more preselected events of a sequence of events within the multi-media file with respect to time;

authenticating, by one or more computer processors, the user based on input of the user interacting with the first multi-media file modified by at least one temporal manipulation vector of the block of temporal manipulation vectors; and replacing, by one or more computer processors, the block of temporal manipulation vectors associated with the first multi-media file with an updated block of temporal manipulation vectors based on a percentage of unused temporal manipulation vectors of the block of temporal manipulation vectors and a duration of time elapsed since the creation of the block of temporal manipulation vectors.

2. The method of claim 1, further comprising:

receiving, by one or more computer processors, from a computing device, a time sequence of interactions of the user with respect to the presentation, modified by a selected temporal manipulation vector of the block of temporal manipulation vectors associated with the first multi-media file; and comparing, by one or more computer processors, the received time sequence of interactions of the user with respect to the modified presentation of the first multi-media file to the baseline time sequence of interactions of the user corresponding to an authentication sequence of one or more preselected events of the first multi-media file to authenticate the user of the computing device.

3. The method of claim 2, wherein:

the user utilizes temporal knowledge of the events within the first multi-media file to authenticate, based on the time sequence of interactions of the user corresponding to the one or more preselected events of the first multi-media file; and the received time sequence of interactions of the user comprises the user respectively reproducing one or more user interactions, with the computing device, for each of the one or more preselected events of the first multi-media file associated with the baseline time sequence of interactions of the user corresponding to the authentication sequence of one or more preselected events of the first multi-media.

4. The method of claim 1, further comprising:

creating, by one or more computer processors, the block of temporal manipulation vectors associated with the first multi-media file comprised of at least two different temporal manipulation vectors;

assigning, by one or more computer processors, a respective unique identifier to each temporal manipulation vector of the block of temporal manipulation vectors;

associating, by one or more computer processors, the assigned unique identifiers of the temporal manipulation vectors to the first multi-media file that is associated with the user profile of the user and the object of the authentication process; and transmitting, by one or more computer processors, the first multi-media file, the block of temporal manipulation vectors, and corresponding unique identifiers to a computing device.

5. The method of claim 4, further comprising:

receiving, by one or more computer processors, an indication that the user of the computing device is accessing the object that utilizes the authentication process;

selecting, by one or more computer processors, at random, a unique identifier corresponding to a temporal manipulation vector of the block of temporal manipulation vectors associated with the first multi-media file;

transmitting, by one or more computer processors, the randomly selected unique identifier corresponding to the temporal manipulation vector of the block of temporal manipulation vectors associated with the first multi-media file; and receiving, by one or more computer processors, from the computing device, another time sequence of interactions of the user with respect to the presentation of the first multi-media file, modified by the temporal manipulation vector, of the block of temporal manipulation vectors, corresponding to the randomly selected unique identifier associated with the first multi-media file.

6. The method of claim 1, further comprising:

preprocessing, by one or more computer processors, the first multi-media file as dictated by another temporal manipulation vector, wherein preprocessing creates a second multi-media file;

transmitting, by one or more computer processors, a null temporal manipulation vector and the second multi-media file to the computing device, wherein the second multi-media file is presented without further temporal manipulation on the computing device; and receiving, by one or more computer processors, from the computing device, another time sequence of interactions of the user with respect to the unmodified presentation of the second multi-media file.

7. The method of claim 1, wherein a time sequence of interactions of the user with respect to a multi-media file further includes:

one or more interactions of the user of the computing device with at least one input/output element of the computing device of the user for each preselected event within the multi-media file; and a corresponding temporal reference for at least one of the one or more interactions of the user of the computing device with the at least one input/output element of the computing device of the user for each preselected event within the multi-media file.

8. A computer program product for authenticating a user of a computing device, the computer program product comprising:

one or more computer readable storage device and program instructions stored on the one or more computer readable storage device, the program instructions readable/executable by one or more computer processors:

program instructions to select a first multi-media file based on a user profile of the user and an object of an authentication process, wherein the first multi-media file is associated with a baseline time sequence of interactions of the user corresponding to an authentication sequence of one or more preselected events of the first multi-media file, and wherein the first multi-media file is supplied by the user;

program instructions to create a block of temporal manipulation vectors based, at least in part, on the user profile and a security requirement of the object of the authentication process, wherein a temporal manipulation vector, of the block of temporal manipulation vectors modifies a presentation of a multi-media file by displacing one or more preselected events of a sequence of events within the multi-media file with respect to time;

program instructions to authenticate the user based on input of the user interacting with the first multi-media file modified by at least one temporal manipulation vector of the block of temporal manipulation vectors; and program instructions to replace the block of temporal manipulation vectors associated with the first multi-media file with an updated block of temporal manipulation vectors based on a percentage of unused temporal manipulation vectors of the block of temporal manipulation vectors and a duration of time elapsed since the creation of the block of temporal manipulation vectors.

9. The computer program product of claim 8, further comprising:

program instructions to receive, from a computing device, a time sequence of interactions of the user with respect to the presentation, modified by a selected temporal manipulation vector of the block of temporal manipulation vectors associated with the first multi-media file; and program instructions to compare the received time sequence of interactions of the user with respect to the modified presentation of the first multi-media file to the baseline time sequence of interactions of the user corresponding to an authentication sequence of one or more preselected events of the first multi-media file to authenticate the user of the computing device.

10. The computer program product of claim 9, wherein:
the user utilizes temporal knowledge of the events within the first multi-media file to authenticate, based on the time sequence of interactions of the user corresponding to the one or more preselected events of the first multi-media file; and
the received time sequence of interactions of the user comprises the user respectively reproducing one or more user interactions, with the computing device, for each of the one or more preselected events of the first multi-media file associated with the baseline time sequence of interactions of the user corresponding to the authentication sequence of one or more preselected events of the first multi-media.

11. The computer program product of claim 8, further comprising:
program instructions to create the block of temporal manipulation vectors associated with the first multi-media file comprised of at least two different temporal manipulation vectors;
program instructions to assign a respective unique identifier to each temporal manipulation vector of the block of temporal manipulation vectors;
program instructions to associate the assigned unique identifiers of the temporal manipulation vectors to the first multi-media file that is associated with the user profile of the user and the object of the authentication process; and
program instructions to transmit the first multi-media file, the block of temporal manipulation vectors, and corresponding unique identifiers to a computing device.

12. The computer program product of claim 11, further comprising:
program instructions to receive an indication that the user of the computing device is accessing the object that utilizes the authentication process;
program instructions to select at random, a unique identifier corresponding to a temporal manipulation vector of the block of temporal manipulation vectors associated with the first multi-media file;
program instructions to transmit the randomly selected unique identifier corresponding to the temporal manipulation vector of the block of temporal manipulation vectors associated with the first multi-media file; and
program instructions to receive from the computing device, another time sequence of interactions of the user with respect to the presentation of the first multi-media file, modified by the temporal manipulation vector, of the block of temporal manipulation vectors, corresponding to the randomly selected unique identifier associated with the first multi-media file.

13. The computer program product of claim 8, further comprising:

program instructions to preprocess the first multi-media file as dictated by another temporal manipulation vector, wherein preprocessing creates a second multi-media file;
program instructions to transmit a null temporal manipulation vector and the second multi-media file to the computing device, wherein the second multi-media file is presented without further temporal manipulation on the computing device; and
program instructions to receive from the computing device, another time sequence of interactions of the user with respect to the unmodified presentation of the second multi-media file.

14. The computer program product of claim 8, wherein a time sequence of interactions of the user with respect to a multi-media file further includes:
one or more interactions of the user of the computing device with at least one input/output element of the computing device of the user for each preselected event within the multi-media file; and
a corresponding temporal reference for at least one of the one or more interactions of the user of the computing device with the at least one input/output element of the computing device of the user for each preselected event within the multi-media file.

15. A computer system for authenticating a user of a computing device, the computer system comprising:
one or more computer processors;
one or more computer readable storage media;
program instructions stored on the computer readable storage media for execution by at least one of the one or more computer processors, the program instructions comprising:
program instructions to select a first multi-media file based on a user profile of the user and an object of an authentication process, wherein the first multi-media file is associated with a baseline time sequence of interactions of the user corresponding to an authentication sequence of one or more preselected events of the first multi-media file, and wherein the first multi-media file is supplied by the user;
program instructions to create a block of temporal manipulation vectors based, at least in part, on the user profile and a security requirement of the object of the authentication process, wherein a temporal manipulation vector, of the block of temporal manipulation vectors modifies a presentation of a multi-media file by displacing one or more preselected events of a sequence of events within the multi-media file with respect to time;
program instructions to authenticate the user based on input of the user interacting with the first multi-media file modified by at least one temporal manipulation vector of the block of temporal manipulation vectors; and
program instructions to replace the block of temporal manipulation vectors associated with the first multi-media file with an updated block of temporal manipulation vectors based on a percentage of unused temporal manipulation vectors of the block of temporal manipulation vectors and a duration of time elapsed since the creation of the block of temporal manipulation vectors.

16. The computer system of claim 15, further comprising:
program instructions to receive, from a computing device, a time sequence of interactions of the user with respect to the presentation, modified by a selected temporal manipulation vector of the block of temporal manipulation vectors associated with the first multi-media file; and program instructions to compare the received time sequence of interactions of the user with respect to the modified presentation of the first multi-media file to the baseline time sequence of interactions of the user corresponding to an authentication sequence of one or more preselected events of the first multi-media file to authenticate the user of the computing device.

17. The computer system of claim 16, wherein:

the user utilizes temporal knowledge of the events within the first multi-media file to authenticate, based on the time sequence of interactions of the user corresponding to the one or more preselected events of the first multi-media file; and the received time sequence of interactions of the user comprises the user respectively reproducing one or more user interactions, with the computing device, for each of the one or more preselected events of the first multi-media file associated with the baseline time sequence of interactions of the user corresponding to the authentication sequence of one or more preselected events of the first multi-media.

18. The computer system of claim 15, further comprising:

program instructions to create the block of temporal manipulation vectors associated with the first multi-media file comprised of at least two different temporal manipulation vectors;

program instructions to assign a respective unique identifier to each temporal manipulation vector of the block of temporal manipulation vectors;

program instructions to associate the assigned unique identifiers of the temporal manipulation vectors to the first multi-media file that is associated with the user profile of the user and the object of the authentication process; and program instructions to transmit the first multi-media file, the block of temporal manipulation vectors, and corresponding unique identifiers to a computing device.

19. The computer system of claim 18, further comprising:

program instructions to receive an indication that the user of the computing device is accessing the object that utilizes the authentication process;

program instructions to select at random, a unique identifier corresponding to a temporal manipulation vector of the block of temporal manipulation vectors associated with the first multi-media file;

program instructions to transmit the randomly selected unique identifier corresponding to the temporal manipulation vector of the block of temporal manipulation vectors associated with the first multi-media file; and program instructions to receive from the computing device, another time sequence of interactions of the user with respect to the presentation of the first multi-media file, modified by the temporal manipulation vector, of the block of temporal manipulation vectors, corresponding to the randomly selected unique identifier associated with the first multi-media file.

20. The computer system of claim 15, wherein a time sequence of interactions of the user with respect to a multi-media file further includes:

one or more interactions of the user of the computing device with at least one input/output element of the computing device of the user for each preselected event within the multi-media file; and a corresponding temporal reference for at least one of the one or more interactions of the user of the computing device with the at least one input/output element of the computing device of the user for each preselected event within the multi-media file.

* * * * *